(12) United States Patent
Mathews et al.

(10) Patent No.: US 12,373,649 B1
(45) Date of Patent: Jul. 29, 2025

(54) REMEDIATING HALLUCINATIONS IN LANGUAGE MODELS

(71) Applicant: U.S. Bancorp, National Association, Minneapolis, MN (US)

(72) Inventors: Sherin Mathews, Fremont, CA (US); Samuel Assefa, Watertown, MA (US)

(73) Assignee: U.S. BANCORP, NATIONAL ASSOCIATION, Minneapolis, MN (US)

( * ) Notice: Subject to any disclaimer, the term of this patent is extended or adjusted under 35 U.S.C. 154(b) by 0 days.

(21) Appl. No.: 19/052,036

(22) Filed: Feb. 12, 2025

(51) Int. Cl.
*G06F 40/30* (2020.01)
*G06F 16/242* (2019.01)
*G06F 40/289* (2020.01)

(52) U.S. Cl.
CPC ............ *G06F 40/30* (2020.01); *G06F 16/243* (2019.01); *G06F 40/289* (2020.01)

(58) Field of Classification Search
CPC .... G06F 40/211; G06F 40/253; G06F 40/268; G06F 40/284; G06F 40/30; G06N 3/08
See application file for complete search history.

(56) References Cited

U.S. PATENT DOCUMENTS

| 7,447,667 | B2 * | 11/2008 | Gong | G06N 5/04 707/999.005 |
| 9,659,056 | B1 * | 5/2017 | Chechik | G06F 16/2462 |
| 9,916,348 | B1 * | 3/2018 | Madhavan | G06F 16/245 |
| 10,977,573 | B1 * | 4/2021 | Dalton | G06F 16/80 |
| 12,067,366 | B1 * | 8/2024 | Heller | G06F 40/35 |
| 2007/0288577 | A1 * | 12/2007 | Kronlund | G06Q 10/107 709/206 |
| 2016/0078149 | A1 * | 3/2016 | Gaucher | G06F 16/90332 704/235 |
| 2017/0220554 | A1 * | 8/2017 | Carter | G06F 40/284 |
| 2017/0228368 | A1 * | 8/2017 | Carter | G06N 5/022 |
| 2018/0144024 | A1 * | 5/2018 | Fu | G06F 16/243 |

(Continued)

OTHER PUBLICATIONS

Temiz, title={Fact Extraction and Verification Pipeline for Covid-19 Related User Posts in Social Media}, year={2022}, school= {Middle East Technical University (Turkey)}, pp. 1-61 (Year: 2022).*

(Continued)

*Primary Examiner* — Lamont M Spooner

(74) *Attorney, Agent, or Firm* — FOLEY & LARDNER LLP

(57) ABSTRACT

A system includes one or more processors to receive a natural language query; execute the first language model using the natural language query to generate a text-based response to the natural language query; segment the text-based response into a plurality of segments each corresponding to a different fact-based response to the natural language query; convert each of the segments into a set of queries; generate a query response to each query by using the query to search a data repository; generate a factuality score of the query responses for the text-based response to the natural language query; generate an aggregate factuality score for the natural language query based on the factuality score for each query generated for each of the plurality of segments; and executing decontextualized atomic decomposition responsive to determining the factuality score does not satisfy a threshold.

20 Claims, 7 Drawing Sheets

(56) References Cited

U.S. PATENT DOCUMENTS

| | | | | |
|---|---|---|---|---|
| 2019/0155963 | A1* | 5/2019 | Boxwell | G06F 40/35 |
| 2021/0124876 | A1 | 4/2021 | Kryscinski et al. | |
| 2021/0209173 | A1* | 7/2021 | Thompson | G06F 16/33 |
| 2021/0241050 | A1* | 8/2021 | Gunaratna | G06N 3/042 |
| 2022/0107946 | A1* | 4/2022 | Kaplan | G06F 16/2433 |
| 2022/0164643 | A1* | 5/2022 | Charnock | G06N 5/046 |
| 2022/0210098 | A1* | 6/2022 | Zhang | G06F 16/335 |
| 2023/0119109 | A1* | 4/2023 | Choubey | G06F 18/2155 |
| | | | | 706/12 |
| 2023/0274086 | A1* | 8/2023 | Tunstall-Pedoe | G06F 16/3344 |
| | | | | 704/9 |
| 2023/0274089 | A1* | 8/2023 | Tunstall-Pedoe | G06F 40/40 |
| | | | | 704/2 |
| 2023/0316006 | A1* | 10/2023 | Tunstall-Pedoe | G06N 3/0442 |
| | | | | 704/9 |
| 2024/0176950 | A1* | 5/2024 | Rani | G06Q 30/0282 |
| 2024/0242037 | A1* | 7/2024 | Heller | G06F 40/35 |
| 2024/0273309 | A1* | 8/2024 | Heller | G06F 40/56 |
| 2024/0273345 | A1* | 8/2024 | Bharadwaj | G06N 3/045 |
| 2024/0296339 | A1* | 9/2024 | Zhang | G06N 20/00 |
| 2024/0346342 | A1* | 10/2024 | Lewis | G06N 3/044 |
| 2025/0005266 | A1* | 1/2025 | Bax | G06F 16/35 |
| 2025/0045256 | A1* | 2/2025 | Gottlob | G06F 16/211 |
| 2025/0047622 | A1* | 2/2025 | Bodigutla | H04L 51/02 |
| 2025/0061116 | A1* | 2/2025 | Leslie | G06F 16/24575 |
| 2025/0061270 | A1* | 2/2025 | Wippich | G06F 40/166 |
| 2025/0094145 | A1* | 3/2025 | Weber | G06F 8/43 |
| 2025/0094707 | A1* | 3/2025 | Portisch | G06F 40/284 |
| 2025/0095798 | A1* | 3/2025 | Shamaei | G06F 40/56 |
| 2025/0110840 | A1* | 4/2025 | Amarasingham | G06F 11/0775 |
| 2025/0142185 | A1* | 5/2025 | Paley | G06F 16/743 |
| 2025/0148308 | A1* | 5/2025 | Vinay | G06F 40/30 |
| 2025/0156642 | A1* | 5/2025 | Serry | G06F 40/284 |

OTHER PUBLICATIONS

Gunjal et al., Molecular Facts: Desiderata for Decontextualization in LLMFact Verification, arXiv:2406.20079v1 [cs.CL] Jun. 28, 2024, pp. 1-17 (Year: 2024).*

Su et al., title={Mitigating entity-level hallucination in large language models}, booktitle={Proceedings of the 2024 Annual International ACM SIGIR Conference on Research and Development in Information Retrieval in the Asia Pacific Region}, pp. 23-31 (Year: 2024).*

Ali, S., Evaluating large language models (LLMs) – Insights about transforming trends (2023), 14 pages, Retrieved from the Internet: https://datasciencedojo.com/blog/evaluating-large-language-models-llms/ (retrieved on Feb. 11, 2025).

Chuang et al., "Lookback Lens: Detecting and Mitigating Contextual Hallucinations in Large Language Models Using Only Attention Maps," (2024), 18 pages, Retrieved from the Internet: https://arxiv.org/abs/2407.07071 (retrieved on Feb. 11, 2025).

Durai, K. "How to Evaluate Response of a RAG Empowered LLM", Dataworkz, 28 pages, Retrieved from the Internet: URL: https://www.dataworkz.com/how-to-evaluate-response-of-a-rag-empowered-llm/ (retrieved on Feb. 11, 2025).

He, K. "Detect Hallucinations Using LLM Metrics", Fiddler AI, 7 pages, Retrieved from the Internet: URL: https://www.fiddler.ai/blog/detect-hallucinations-using-llm-metrics (retrieved on Feb. 11, 2025).

Lee et al., "Factuality Enhanced Language Models for Open-Ended Text Generation," (2023), 24 pages, Retrieved from the Internet: https://arxiv.org/abs/2206.04624 (retrieved on Feb. 11, 2025).

Tripathi, G. "How to Evaluate a Large Language Model (LLM)?", Analytics Vidhya, 29 pages, Retrieved from the Internet: URL: https://www.analyticsvidhya.com/blog/2023/05/how-to-evaluate-a-large-language-model-llm/ (retrieved on Feb. 11, 2025).

* cited by examiner

REMEDIATING HALLUCINATIONS IN LANGUAGE MODELS

BACKGROUND

Advanced language models, particularly large language models (LLMs), have demonstrated exceptional proficiency in generating human-like responses across a diverse array of queries. These models are being increasingly integrated into various industries to enhance functionality and user interaction. Despite the advancements and widespread adoption of LLMs, current models, such as text-generation models, frequently produce responses that contain factual inaccuracies. These models are prone to generating content that, while appearing credible and well-structured, may be factually incorrect or lack precision. This limitation undermines their overall performance and reliability, presenting significant challenges for their deployment in critical applications across various domains.

BRIEF DESCRIPTION OF THE DRAWINGS

FIG. 5 illustrates an example machine learning framework that techniques described herein may benefit from.

DETAILED DESCRIPTION

Figure 1:
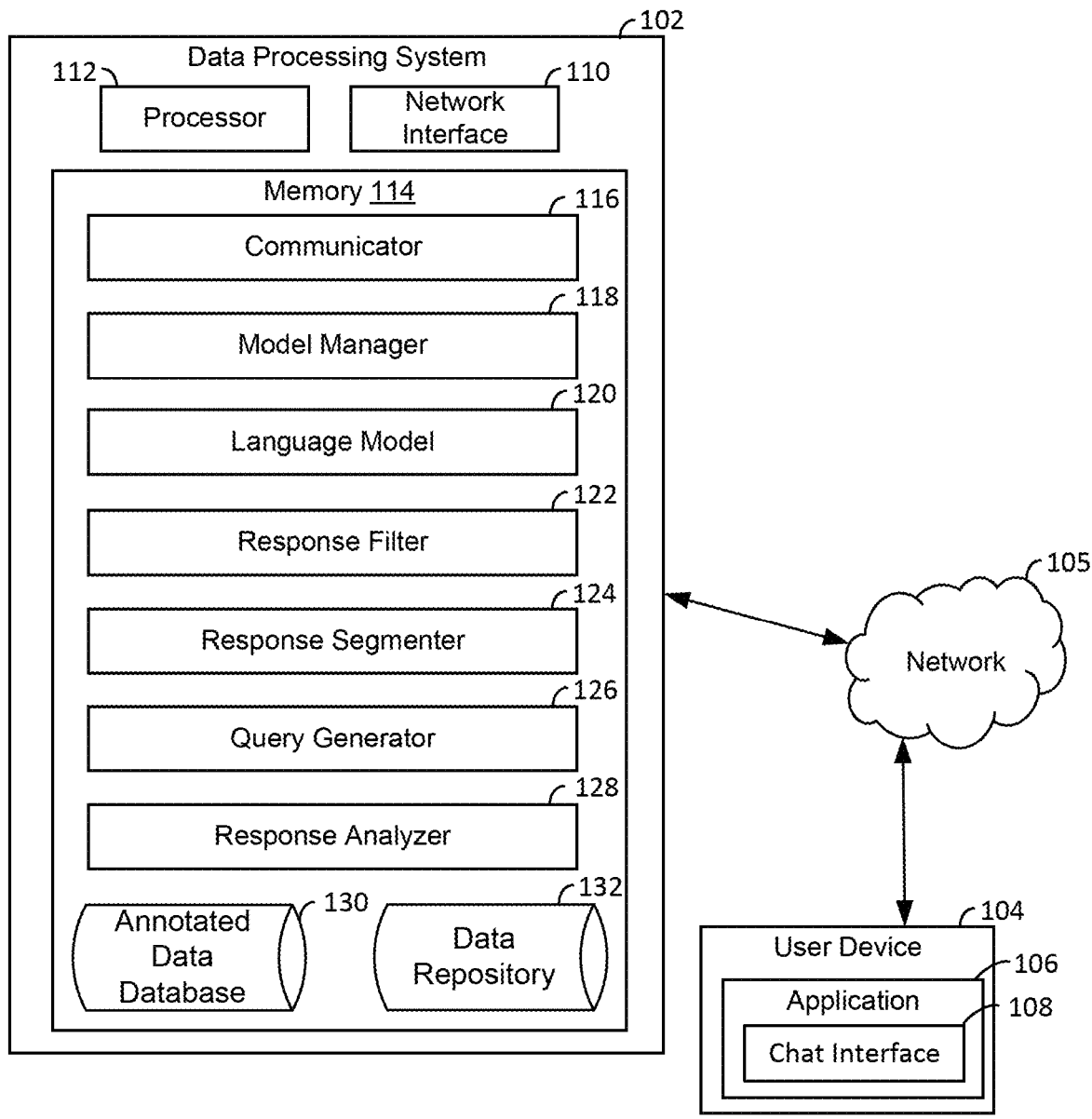
FIG. 1 illustrates an example system for detecting or remediating hallucinations for a language model, in accordance with an implementation.

As mentioned above, advanced language models, particularly large language models (LLMs), have demonstrated a proficiency in generating human-like responses across a diverse range of queries. These models are being increasingly integrated into various industries to enhance functionality and improve user interactions. Despite these advancements, current LLMs frequently generate responses that contain factual inaccuracies. These models are susceptible to producing content that, while appearing credible and well-structured, may be factually incorrect or imprecise. This limitation significantly undermines their performance and reliability, posing substantial challenges for their deployment in critical applications across various domains. The presence of such inaccuracies compromises the dependability of LLM-generated content, thereby restricting their practical utility in high-stakes environments where accuracy is paramount.

Systems may attempt to address the problem of hallucinations relating to factual inaccuracies in LLMs by primarily focusing on task-specific approaches. These can include retrieval-enhanced verification methods for question-answering systems and hallucination monitoring techniques for text summarization tasks. While these strategies have shown to be effective within their respective scopes, they lack the versatility required to handle the broad array of tasks and domains in which LLMs are employed. Additionally, many existing techniques operate at the sentence level, evaluating factuality based on entire sentences. Such techniques may miss factual inaccuracies in cases in which a single sentence contains multiple individual facts.

Furthermore, the complexity of verifying factual accuracy is compounded by inconsistencies in datasets, disparate evaluation tools, and varying benchmarking methods across different studies. These factors hinder the ability to compare results effectively and impede progress in developing more reliable verification mechanisms. Given the multifunctional capabilities of LLMs and their widespread application across diverse fields, there is a need for a more generalized and universal framework for fact-checking and truth verification for hallucination reduction.

A computer implementing the systems and methods described herein can overcome the aforementioned technical deficiencies by filtering and segmenting responses to natural language queries generated by a language model (e.g., a large language model, a small language model, a transformer, or any other model configured to generate text responses to natural language queries). The computer can segment the responses into segments that each include a different fact included in the responses. The computer can detect hallucination-related metrics based on and/or for the individual segments. The computer can train the language model responsive to determining hallucination-related metrics do not satisfy a criterion (e.g., a threshold).

For example, the computer can receive a natural language query from a client device. The computer can receive the natural language query through a chat interface presented on the client device. Responsive to receiving the natural language query, the computer execute a language model using the natural language query to generate an initial text-based response (e.g., a response including one or multiple facts requested in the in the natural language query). The computer can apply one or more filters to the response to remove any text that is not factually based, such as personal viewpoints or routine conversations.

The computer can segment the filtered response into multiple segments, each representing a distinct fact. In some cases, the computer can do so using a second language model trained for such segmenting. For each segment, the computer can generate a set of queries that are configured to search or query a data repository for information that is relevant to the fact represented or indicated by the segment. The computer can execute the queries to retrieve relevant data for each of the respective segments.

The computer can generate one or more metrics from the retrieved data the segments. The computer can generate the metrics for each segment of the filtered response. Examples of the metrics can include fluency, diversity, repetition, bilingual evaluation understudy (BLEU) score, similarity score, factuality, hallucinated named entity (NE) error, and/ or an entailment ratio. The computer can combine the different metrics to generate a factuality score for the segment for which the computer generated the metrics.

The computer can use the metrics and/or the factuality score to determine whether the generated output from the language model is factual. For example, the computer can compare each of the metrics to a threshold (e.g., the same threshold or a threshold defined for each metric). Responsive to determining at least one metric exceeds the threshold, the computer can indicate the high possibility of a hallucinated response from the language model. This hallucination detection process helps the model detect hallucinated outcomes and improve its accuracy over time, reducing the likelihood of generating hallucinations in future responses. Thus, a machine learning, artificial intelligence, or language model system implementing techniques described herein is technically improved (e.g., able to produce more accurate output or detect inaccurate output) compared to a system lacking such techniques. Further, these techniques can be integrated into or otherwise used with a training or fine-tuning process to produce improved models.

Through this process of filtering, segmenting, querying, and training an entity detection model on RAG knowledge base, the computer can detect and remediate hallucinations in language models. This system not only enhances the accuracy of the responses but also builds trust with users by providing reliable and factual information. As a result, the language model becomes a more effective and dependable tool for a wide range of applications.

For example, FIG. 1 illustrates an example system 100 for detecting and remediating hallucinations in a language model, in accordance with an implementation. In brief overview, the system 100 can include a data processing system 102 and/or a user device 104. The data processing system 102 and/or the can each include one or more aspects or features described elsewhere herein, such as in reference to the computing environment 400 of FIG. 4. The data processing system 102 can be configured to use one or more language models to generate responses to natural language queries. The data processing system 102 can evaluate the responses by segmenting the responses based on the facts that are indicated in the responses. The data processing system 102 can generate metrics for each of the respective segments. The data processing system 102 can compare the metrics to different criteria (e.g., one or more thresholds). The data processing system 102 can detect hallucinations in language models responsive to determining a metric does not satisfy a criterion (e.g., exceeds or is less than a threshold). In this way, the data processing system 102 can repeat this process over time to improve the accuracy of fact-based responses generated by the language models and otherwise reduce hallucinations in the responses that the language models generate. The system 100 may include more, fewer, or different components than shown in FIG. 1.

The data processing system 102 and/or the user device 104 can include or execute on one or more processors or computing devices and/or communicate via a network 105. The network 105 can include computer networks such as the Internet, local, wide, metro, or other area networks, intranets, satellite networks, and other communication networks, such as voice or data mobile telephone networks. The network 105 can be used to access information resources such as web pages, websites, domain names, or uniform resource locators that can be presented, output, rendered, or displayed on at least one computing device (e.g., the data processing system 102 and/or the user device 104), such as a laptop, desktop, tablet, personal digital assistant, smartphone, portable computer, or speaker.

The data processing system 102 and/or the user device 104 can include (e.g., each include) or utilize at least one processing unit or other logic devices such as a programmable logic array engine or a module configured to communicate with one another or other resources or databases. As described herein, computers can be described as computers, computing devices, user devices, or client devices. The data processing system 102 and/or the user device 104 may each contain a processor and a memory. The components of the data processing system 102 and/or the user device 104 can be separate components or a single component. The system 100 and its components can include hardware elements, such as one or more processors, logic devices, or circuits.

The user device 104 can be an electronic computing device (e.g., a cellular phone, a laptop, a tablet, or any other type of computing device). The user device 104 can include a display with a microphone, a speaker, a keyboard, a touchscreen, or any other type of input/output device. A user can access a platform (e.g., a website or virtual desktop) provided by the data processing system 102 through the user device 104. The platform may include chatbot functionality through which the user can communicate, such as to navigate through different pages of the platform and/or to ask questions regarding the platform.

The user device 104 can host or store an application 106 in memory. The application 106 can be a browser, an application programming interface (API), or any other type of application that can connect with other applications or computing devices over the network 105. The application 106 can be executed by the user device 104 and can be configured to connect with the data processing system 102 in an established connection. In one example, a user accessing the user device 104 can access the platform provided by the data processing system 102 through the application 106.

The application 106 can include a chat interface 108 through which a user can provide input (e.g., via an input/output device). For example, the chat interface 108 can be a form into which a user can type text or natural language queries. In another example, the chat interface 108 can be an audio interface into which a user can speak or provide an auditory input. The user can provide the input as a natural language query into the chat interface 108 and select a submit button. Responsive to the selection of the submit button, the application 106 can transmit the natural language query to the data processing system 102. The data processing system 102 can receive the natural language query and generate a response to the natural language query using a language model (e.g., a first language model). The data processing system 102 can transmit the generated response back to the user device 104, which can display the generated response on the chat interface or otherwise on a user interface. The user can view the response and provide an input based on the response, repeating the process. Accordingly, through the chat interface 108, the application 106 can facilitate a conversation between the user accessing the user device 104 and the data processing system 102.

The data processing system 102 may comprise one or more processors that are configured to train a language model over time to reduce hallucinations in the language model's responses. The data processing system 102 may comprise a network interface 110, a processor 112, and/or memory 114. The data processing system 102 may communicate with the user device 104 and/or any other computing devices via the network interface 110, which may be or include an antenna or other network device that enables communication across a network and/or with other devices. The processor 112 may be or include an ASIC, one or more FPGAs, a DSP, circuits containing one or more processing components, circuitry for supporting a microprocessor, a group of processing components, or other suitable electronic processing components. In some embodiments, the processor 112 may execute computer code or modules (e.g., executable code, object code, source code, script code, machine code, etc.) stored in memory 114 to facilitate the activities described herein. The memory 114 may be any volatile or non-volatile computer-readable storage medium capable of storing data or computer code.

The memory 114 may include a communicator 116, a model manager 118, a language model 120, a response filter 122, a response segmenter 124, a query generator 126, a response analyzer 128, an annotated data database 130, and/or a data repository 132. In brief overview, the components 116-128 can receive a natural language query. The components 116-128 can execute the language model 120 using the natural language query to generate a text-based response to the natural language query. The components 116-128 can segment the text-based response into a plurality of segments that each corresponds to a different fact-based response (e.g., a fact responsive a request in the natural language query) to the natural language query. The components 116-128 can generate one or more queries for each of the plurality of segments, each of the one or more queries configured to be used to search the data repository 132. For each query of the one or more queries generated for each of the plurality of segments, the components 116-128 can generate a query response to the query by using the query to search the data repository 132. The components 116-128 can generate one or more metrics based on the query response generated for each query of the one or more queries generated for each of the plurality of segments. The components 116-128 can assess the language model based on the one or more metrics not satisfying a threshold. In this way, the components 116-128 can detect hallucinations in responses that the language model 120 generates in response to queries for fact-based output. In addition or instead, the components can train or fine tune the language model 120 to reduce hallucinations in responses that the language model 120 generates to fact-based queries.

The communicator 116 may comprise programmable instructions that, upon execution, cause the processor 112 to communicate with the user device 104 and/or any other computing device. The communicator 116 can be or include an application programming interface (API) that facilitates communication between the data processing system 102 (e.g., via the network interface 110 of the data processing system 102) and other computing devices. The communicator 116 may communicate with the user device 104 and/or any other computing devices across a network (e.g., the network 105).

In one example, the communicator 116 can establish a connection with a computing device (e.g., the user device 104). The communicator 116 can establish the connection with the computing device over the network 105. To do so, the communicator 116 can communicate with the computing device across the network 105. In one example, the communicator 116 can transmit a syn packet to the computing device 104 (or vice versa) and establish the connection using a TLS handshaking protocol. The communicator 116 can use any handshaking protocol to establish a connection with the computing device 104. The data processing system 102 can communicate with the computing device 104 over the established connection.

The model manager 118 can include programmable instructions that, upon execution, cause the processor 112 to facilitate the methods and processes described herein. In some cases, the model manager 118 can be or include a task agent that is configured to activate different tools, large language models, and/or applications stored in the memory 114 of the data processing system 102. The model manager 118 can be or include a large language model configured to process outputs of the different tools, models, and/or applications. In one example, the model manager 118 can be configured to interact with the language model 120 to generate responses to natural language queries that the data processing system 102 receives, evaluate the responses to generate metrics for each of the responses, and/or train the language model 120.

The language model 120 can be or include a large language model, a small language model, a transformer, or another type of machine learning model configured to generate text responses to natural language queries. For example, the language model 120 can receive as input a natural language query for one or more facts (e.g., what year did the Titanic crash and who was the captain during the crash). Based on the natural language query, the language model 120 can apply learned weights and/or parameters to generate a response to the natural language query, including answers to the query for the one or more facts. In some cases, the language model 120 can use retrieval-augmented generation techniques to generate responses. For instance, responsive to receiving the natural language query requesting one or more facts, the language model 120 can determine to query the data repository 132 to retrieve documents or files that are relevant to responding to the natural language query (e.g., that likely include the answers to the request). The language model 120 can retrieve data that is relevant to generating a response to the natural language query and process the retrieved data to generate a response including the answers to the requests for facts (e.g., including the requested facts). The language model 120 can query the data repository 132 and retrieve the data, for example, by creating an embedding (e.g., a numerical vector) from the natural language query and identifying data in the data repository 132 that corresponds to an embedding with a similarity to the embedding of the natural language query above a threshold or that otherwise has the highest similarity). The language model 120 can present the generated response at the interface (e.g., the chat interface 108) through which the initial natural language query was generated or input by a user.

The data repository 132 can be a graphical or relational database. In some cases, the data repository 132 can be or include a vector database. For example, the data repository 132 can include one or more files or data structures that each includes one or more sets of data. The sets of data can include data in different formats, such as paragraphs, tables, graphs, videos, images, sentences, numbers, etc. The datasets can include data for any type of content. The language model 120 or another language model or encoding model (e.g., an encoding machine learning model, such as a neural network) can generate (e.g., using an encoding layer of the model) an embedding for each of the sets of data stored in the data repository 132, such as by using the sets of data as an input. The data repository 132 can store the embeddings in the data repository 132 with the sets of data from which the embeddings were generated. Accordingly, the embeddings can be stored such that the embeddings can be used as a key to retrieve the sets of data from which the embeddings were respectively generated.

The model manager 118 can use the components 122-128 to evaluate one or more responses produced by the language model 120. The evaluation can be used as the basis for future training or fine tuning of a next version of the language model 120. The model manager 118 can do so based on individual natural language queries. For example, the communicator 116 can receive a natural language query from the user device 104. The communicator 116 can receive the natural language query from the chat interface 108 (e.g., a user at the user device 104 can input the natural language query into the chat interface 108 and select a submit button that causes the user device 104 to transmit the natural language query to the data processing system 102). The natural language query can be a request for a plurality of facts. For example, the natural language query can be for the year that Acme Corp. was incorporated and for the individual that was the first CEO of Acme Corp. The year and the name of the individual are facts because there is an objective answer to them.

The model manager 118 can input the natural language query requesting the facts into the language model 120 and execute the language model 120. The execution can cause the language model 120 to generate a response (e.g., a text-based response) to the natural language query including the requested facts as answers. For instance, the response can be "Acme Corp. was incorporated in 1970. Jack Johnson was the CEO at the time of the incorporation and thus the first CEO of Acme Corp." To generate the response, the language model 120 can generate an embedding from the natural language query. The language model 120 can use the embedding to query the data repository 132. The language model 120 can identify one or more sets of data that have a similarity exceeding a threshold or otherwise a highest similarity (e.g., a defined number of datasets that correspond with embeddings with the highest similarity to the embedding). The language model 120 can retrieve the identified datasets. The language model 120 can process the content of the identified datasets to generate a response that includes the requested facts or are responsive to the requested facts.

The model manager 118 can generate one or more metrics from the generated response to the natural language query. To do so, the model manager 118 can segment the generated response into segments that correspond to the individual facts included in the response and generate one or more metrics for each segment. For example, the model manager 118 can first execute the response filter 122 to filter the generated response to the natural language query. The response filter 122 can be or include programmable instructions that, upon execution, cause the processor 112 to filter responses output by the language model 120. The response filter 122 can do so by applying one or more filtering criteria, or filters, to the responses. For instance, the response filter 122 can be configured to apply filters to remove statements in the generated response that meets at least one of the following filtering criteria:

- Use of first-person pronouns (e.g., I, we, us), which predominantly indicate personal beliefs or informal discourse. For example, sentences starting with "I think . . . " or "I believe . . . "
- Presence of question marks. This includes queries such as "Do you want to hear something interesting about this news?" or prompts like "What are your thoughts on this?"
- Additionally, resolving coreferences and uncertainties, such as vague pronouns and related linguistic elements, is crucial step as filtering before we step into evaluating the claims.
- Absence of named entities, which typically serve as cornerstones of factual information. Examples include phrases like "Check this weblink out" or statements like "To say that this person is an example of something is absurd."

The response filter 122 can identify statements in the response that meet these criteria using a language model (e.g., a language model separate from the language model 120) or a semantic model that is configured to detect contexts or entities of text-based language. The model manager 118 can input the response to the natural language query output by the language model 120 into the response filter 122. The response filter 122 can filter response according to the filtering criteria to generate a filtered response to the natural language query.

By using the response filter 122, the model manager 118 can more accurately identify hallucinations within the response to the natural language query that are related to generating incorrect facts. For instance, not all generated text is factually based. There are instances where grammatically correct and coherent content lacks substantial, verifiable facts, such as personal viewpoints or routine conversations. In the context of a knowledge base Q/A scenario, this first step of filtering may be to screen out "non-check worthy" statements that exhibit characteristics identified in the filtering criteria.

The model manager 118 can execute the response segmenter 124 to segment the response (e.g., filtered response) to the natural language query generated by the language model 120. The response segmenter 124 can be or include programmable instructions that, upon execution, cause the processor 112 to segment responses that include multiple facts or statements into separate segments that each indicate or include a different fact. Each fact or statement can be a claim. The response segmenter 124 can segment the responses by inputting the response or filtered response to another language model (e.g., a language model different from the language model 120, or a second language model) and executing the language model. Based on the execution, the response segmenter 124 can identify the individual facts or statements of the response or filtered response and separate or generate separate strings that each include a different fact or statement of the individual facts or statements.

In some cases, the response segmenter 124 can separate the facts or statements according to different criteria. For example, the response segmenter 124 can use the language model to separate facts or statements limiting each fact or statement to a maximum of 15 words. In another example, the response segmenter 124 can use a confidence threshold. For instance, the response segmenter 124 can input (e.g., in a prompt), with the response to the natural language query, a confidence score (e.g., 80%) indicating a minimum degree of confidence for the language model to have to segment a statement or fact. If a portion of the response does not meet the confidence threshold, the language model can ignore the portion or otherwise not generate or identify a separate segment for the portion.

The model manager 118 can execute the query generator 126 to generate one or more queries for each segment generated from the response or filtered response. For example, the query generator 126 can be or include programmable instructions that, upon execution, cause the processor 112 to generate queries for individual segments of responses or filtered responses, or otherwise convert the segments into one or more queries. The query generator 126 can generate the queries in one of a few manners. For instance, in some cases, the query generator 126 can generate an embedding from each of the segments. The query generator 126 can generate the embedding using the same language model (e.g., the language model 120 or a different language model) that was used to generate the embedding for each of the sets of data stored in the data repository 132. Accordingly, the embedding can be in the same vector space as the embeddings in the data repository 132. Each embedding generated for the segments can be configured to be used to query or search the data repository 132, such as based on a similarity with the embeddings stored in the data repository 132, as described above.

In some cases, the query generator 126 can generate multiple queries for each of the segments. For example, the query generator 126 can execute a language model (e.g., the language model 120 or another language model) to generate queries that may refute the claim of a segment. For example, if a statement is "The Eiffel Tower is in Paris," the language model can generate the queries "location of Eiffel Tower" and/or "Eiffel Tower city." The language model can do so, for example, by applying learned weights and/or parameters to the statement. The query generator 126 can similarly generate any number of queries for each segment. The query generator 126 can generate an embedding for each query that can be used to query the data repository 132 as described above.

The model manager 118 can execute the response analyzer 128 to generate one or more metrics for each segment generated from the response or filtered response to the natural language query. For example, the response analyzer 128 can be or include programmable instructions that, upon execution, cause the processor 112 to generate a set of one or more metrics for each of the segments. One example of a metric that the response analyzer 128 can generate for each segment is a statement level factuality metric. The statement level factuality metric can indicate a level of support for a generated statement. To generate the statement level factuality metric, the response analyzer 128 can use the queries generated for each of the segments to search the data repository 132. Based on the searches, the response analyzer 128 can retrieve one or more data sets or portions of data sets that satisfy the search criteria (e.g., correspond with an embedding with a similarity with the querying embedding above a threshold or otherwise a defined number of datasets with the highest similarity to the embedding of the respective query). Responsive to performing the query or queries for each segment, the response analyzer 128 can input the text of the respective segments and the queries into a language model (e.g., the language model 120). The response analyzer 128 can include instructions to evaluate the support that the retrieved data sets provide for each of the segments in the input into the language model. The response analyzer 128 can execute the language model with the input to cause the language model to apply learned weights and/or parameters to generate a numerical, alphabetical, or alphanumerical value indicating the level of support the retrieved data provides the segment. The value can be on a defined scale, such as between 1 and 100 or between 0 and 1. This value can be the statement level factuality metric.

In some cases, the response analyzer 128 can output a binary indicator of whether each segment is supported. For example, the response analyzer 128 can compare the value for the support to a threshold (e.g., 80 or 0.8). Responsive to the value exceeding the threshold, the response analyzer 128 can determine the segment is supported. Otherwise, the response analyzer 128 can determine the segment is not supported (e.g., is a hallucination).

In some cases, the response analyzer 128 determines a relevancy metric of each segment. The relevancy metric can indicate a relevancy of the fact included in the segment to responding to the natural language query. The response analyzer 128 can determine the relevancy metric using a language model (e.g., the language model 120 or a different language model). To do so, the response analyzer 128 can input the segment into the language model with the natural language query with a prompt indicating to generate a value indicating whether the fact included in the segment is relevant to generating a response to the natural language query. The response analyzer 128 can execute the language model to cause the language model to generate such a value. The value can be between 1 and 100 or between 0 and 1. The response analyzer 128 can compare the relevancy metric to a threshold (e.g., 80 or 0.8). Responsive to determining the relevancy metric exceeds the threshold, the response analyzer 128 can determine the segment is relevant. Otherwise, the response analyzer 128 can determine the segment is irrelevant.

Other example of metrics that the response analyzer 128 can generate for each segment can include fluency, diversity, repetition, and/or a bilingual evaluation understudy (BLEU) score. The response analyzer 128 can generate a fluency metric for each segment by determining a mean perplexity of generated continuations evaluated using a language model (e.g., the language model 120 or a different language model). Perplexity measures the likelihood of a machine-generated text given a language model. Perplexity can be used to evaluate the fluency and coherence of generated text. The response analyzer 128 can generate perplexity by exponentiating the negative average log probability of the words in the text. A lower perplexity score for a segment indicates that the language model can better predict the next word in the sequence for the segment.

The response analyzer 128 can generate a diversity metric for each segment. The response analyzer 128 can determine the diversity by determining a mean number of distinct n-grams (e.g., 4-gram) of the segment. The model manager 118 can iteratively insert the natural language query into the language model 120 to generate responses. The model manager 118 can segment (e.g., using the response segmenter 124) each response, in some cases after filtering each response. The response analyzer 128 can group the segments generated from each of the responses that correspond to the same fact or statement. The response analyzer 128 can do so by generating embeddings from the segments and grouping the segments that are similar above a threshold and/or that are of a defined number with the highest similarity. The response analyzer 128 can identify the group of segments containing the segment for which the response analyzer 128 is generating the diversity metric. The response analyzer 128 can count (e.g., generate and/or increment a counter) the unique sequences of words (e.g., n-grams) in each segment of the group of segments containing the segment. The response analyzer 128 can determine a mean or average of the counts. The response analyzer 128 can normalize the mean count based on the mean length of the text of each segment of the group of segments. The response analyzer 128 can do so, for example, by dividing the mean number of distinct n-grams (D) by the mean number of words (L) of the segments or a total number of words across the segments, as illustrated with the following equation:

$$\text{Normalized Diversity} = D/L$$

The response analyzer 128 can generate a repetition metric for each segment. The response analyzer 128 can generate the repetition metric using the groups of segments as generated for each segment as described above with respect to the diversity metric. For example, the response analyzer 128 can compare the strings or substrings (e.g., portions of strings) between the segments in the group of segments. The response analyzer 128 can perform the comparison using Holtzman code. For example, the response analyzer 128 can identify substrings (e.g., sequences of words) that repeat across the group of segments. The response analyzer 128 can maintain and increment a counter for each substring. The response analyzer 128 can generate the repetition metric to be or be proportional to the size of the count of the counter.

The response analyzer 128 can generate a BLEU metric or score for each segment. The BLEU metric is a precision-based metric that compares a machine-generated translation to one or more human-generated references. The response analyzer 128 can generate the BLEU metric by identifying the n-gram precision of the machine-generated translation. N-grams are sequences of n words, and precision is the proportion of n-grams that are correct in the machine-generated translation.

The response analyzer 128 can use data stored in the annotated data database 130 to generate a factual similarity metric for each segment. For example, the annotated data database 130 can be a graphical or relational database that includes data that the response analyzer 128 treats as the ground truth for statements generated by the language model 120. The ground-truth data sets can be curated at the document level and/or sentence level, depending on the types of metrics for which the ground-truth data sets are to be used to generate. To identify document ground-truth data sets, documents stored in the annotated data database 130 can be annotated to indicate portions of the documents that are relevant to the fact included in the segment. For sentence-level ground-truth knowledge, the data processing system 102 may perform sentence selection by using two different methods to maximize the chance of recalling the relevant ground-truth knowledge. The data processing system 102 can treat the generated text of the segment as query q and sentences as a pool of candidates $C=\{c_1, c_2, c_3, \ldots c_N\}$ where N is the number of sentences in the associated document. One ground-truth sentence is retrieved by obtaining the term frequency-inverse document frequency (TF-IDF) vector representations of q and C and selecting the $c_i$ with the highest cosine similarity with the q. Another ground truth is retrieved by obtaining the contextual representation of q and C using a sentence transformer and selecting the $c_j$ with the highest cosine similarity. The response analyzer 128 can compare the text of the segment with the retrieved ground truth document or sentences to generate one or more of four similarity metrics: Rouge-1, Rouge-2, Rouge-L, and/or BERTScore. The response analyzer 128 can identify the highest similarity of the four as the factual similarity metric for the segment. The response analyzer 128 can similarly generate factual similarities for each segment.

The response analyzer 128 can use metrics such as BLEU Score, F1 Score, Rouge, recall (coverage of factual information) and adopt an improved estimator for a better approximation of factual precision to evaluate factuality and, thereby, correct model generations for individual segments. The BLEU score can evaluate the language model 120's ability to generate coherent and grammatically correct text, with higher BLEU scores indicating better performance. ROUGE scores assess the language model 120's ability to generate text that is similar to the reference text, with higher ROUGE scores indicating better performance. F1 score measures the language model 120's ability to correctly classify text as relevant or irrelevant, with higher F1 scores indicating better performance.

The different metrics can be used to determine or adjust a factuality metric (e.g., a factuality score) of each segment. For example, a higher diversity metric and/or a lower repetition metric may increase or otherwise correspond to a higher factuality metric. A higher fluency metric can increase or correspond to a higher factuality metric. A higher similarity score, BLEU score, F1 score, Rouge score, and/or a recall score can increase or otherwise correspond to a higher factuality metric. The response analyzer 128 can determine or adjust the factuality metric for each segment as a function (e.g., an average or median) of each of the metrics for the segment. For instance, the response analyzer 128 can adjust the statement level factuality metric based on the other metrics generated for the same segment or otherwise include the statement level factuality metric in a function that the response analyzer 128 executes for the segment. The response analyzer 128 can use any combination or permutation of such metrics to generate the factuality metric for each segment.

In some cases, in addition to or instead of the metrics listed above, the response analyzer 128 can generate one or more hallucination metrics for each segment. For example, the response analyzer 128 can be a named entity (NE)-based metric and a textual entailment-based metric. Each such metric can capture a different aspect of factuality, so they provide a better understanding of factuality.

To generate the NE-based metric for a segment, the response analyzer 128 can use the equation:

$$NE_{ER} = |HALLU_{NE}|/|ALL_{NE}|$$

where $ALL_{NE}$ is the set of all the NEs detected in the segment, and $HALLU_{NE}$ is a subset of $NE_{All}$ that does not appear in a ground-truth document stored in the annotated data database 130 that the response analyzer 128 identifies (e.g., based on a user input and/or based on a similarity between an embedding of the document and an embedding of the segment satisfying a criteria, as described herein). The response analyzer 128 can similarly generate the NE-based metric for each segment.

To generate the entailment ratio metric for a segment, the response analyzer 128 can determine whether a hypothesis is entailed by, refuted by, or neutral to a given premise. Entailment-based metrics are based on the rationale that factual generation will be entailed by the ground-truth knowledge. The response analyzer 128 can determine the entailment metric for each segment according to the following equation:

$$Entail_R = |ENTAIL_{gen}|/|ALL_{gen}|,$$

where $ALL_{gen}$ is a set of all generations (e.g., each group segments for the segment as described above), and $ENTAIL_{gen}$ is the set of generations that are entailed by an entailment model. The response analyzer 128 can use a pre-trained entailment model (e.g., RoBERTa) fine-tuned on a ground-truth data set stored in the annotated data database 130 to obtain the entailment metric for the segment. The response analyzer 128 can determine the entailment ratio metric using the sentence-level ground truth because only a few sentences may be relevant to specific factual information in a segment.

The hallucination metrics can be used to determine or adjust the factuality metric of each segment, in addition to or instead of the other metrics described above. For example, a higher NE error and a low entailment ratio can increase or correspond to a higher factuality metric. The response analyzer 128 can generate or adjust the factuality metric for each segment of the response generated for the natural language query based on the hallucination metrics generated for the segment.

The response analyzer 128 can generate response level metrics in addition to or instead of the segment level metrics. The response level metrics can include response level factuality and response level fluency. To determine response level factuality, the response analyzer 128 can prompt a language model (e.g., a different language model than the language model 120) to judge the factuality of the claim given the retrieved list of evidence snippets. In doing so, the response analyzer 128 can follow a zero-shot chain-of-thought reasoning process. For example, the language model can attempt to reason about whether the claim is factual or not. If an error is identified, the response analyzer 128 provides an input requesting an explanation and an attempt to rectify the mistake. The response analyzer 128 can additionally or instead generate a fluency of the response. The response analyzer 128 can generate the fluency using the perplexity metric, as described above.

The model manager 118 can use the metrics and/or scores to determine whether to train the language model 120. For example, the model manager 118 can compare the factuality metric for each of the segments to a threshold and/or compare the response level metric or metrics to the threshold. In some cases, the model manager 118 can generate an aggregated or aggregate factuality metric as a function (e.g., sum, average, mean, etc.) of the factuality metric for each segment and compare the aggregated factuality metric to the threshold. In some cases, the model manager 118 can compare each metric generated for each segment to the threshold. In doing so, the model manager 118 can compare the metrics to thresholds specific to the type of the metric or to the same threshold.

Responsive to determining at least one metric does not satisfy the threshold (e.g., is below the threshold for metrics in which a high value corresponds with a high factuality or is above the threshold for metrics in which a low value corresponds to an increase in the factuality score), the model manager 118 can determine to detect hallucinated responses from the language model 120. In another example, the model manager 118 can detect hallucinations from the language model 120 in response to determining the segments included at least one irrelevant fact. In some examples, the model manager 118 or another component can cause one or more language models 120 to be trained or fine-tuned to reduce the risk of generating hallucinations in response to future queries. The model manager 118 may train the language model 120 using supervised, semi-supervised, or unsupervised learning techniques. For example, the model manager 118 can use supervised learning to train the language model 120 using a labeled training dataset. But in some examples, the model manager 118 does not train or fine tune models. For instance, the model manager 118 may only calculate metrics and verify against thresholds. Then if scores are as per the threshold, the model manager check for knowledge errors, falsehood errors, retrieval errors and further proceed through decontextualization process to assess if decontextualization remediates hallucinations. This process can be repeated for any number of natural language queries and outputs.

In some cases, the model manager 118 may determine whether the segments include any irrelevant or unsupported facts prior to determining any metrics. The model manager 118 may determine whether to train the language model 120 based on the relevancy before generating the metrics. In doing so, the model manager 118 may avoid using the processing resources required to generate the metrics in cases in which the language model generated at least one irrelevant or unsupported fact.

The data processing system 102 can repeat this process over time for any number of natural language queries. In some cases, the data processing system may only deploy the language model 120 to use as a chatbot on the platform responsive to determining the language model 120 generated a response that did not elicit further hallucination check (e.g., determines the language model 120 generated a response for which the data processing system 102 did not determine a metric does not satisfy a threshold and/or that does not include an irrelevant fact) or in response to making such a determination at least a threshold number of instances in a row.

In one example, responsive to determining a metric does not satisfy a threshold or determining at least one segment generated for a natural language query contains an irrelevant or unsupported fact, the model manager 118 can automatically perform operations as follows. The model manager 118 can check for hallucinations or knowledge errors. Hallucinations or knowledge errors can occur when the language model 120 generates false or inaccurate information due to insufficient knowledge. To check for hallucinations or knowledge errors, the model manager 118 can generate a precision metric that measures the fraction of retrieved documents for generating the response that are relevant. The model manager 118 can check for a knowledge error that measures the fraction of relevant documents that are retrieved. By calculating these metrics, the model manager 118 can quantify the errors in terms of missing relevant information. Low recall indicates missing relevant information, while low precision indicates the model retrieving irrelevant information. The model manager 118 can additionally or instead calculate a Mean Reciprocal Rank (MRR). MRR measures the reciprocal of the rank of the first relevant document in the retrieval results. A lower MRR means relevant documents are ranked lower, indicating a knowledge error. The model manager 118 can additionally or instead calculate a Normalized Discounted Cumulative Gain (NDCG). NDCG is a measure that considers the graded relevance of retrieved documents and their position in the ranking. It penalizes relevant documents that are ranked lower, capturing knowledge errors in the form of incorrect ranking.

The model manager 118 can additionally or instead calculate a Mean Average Precision (mAP) is the mean of average precision scores for all queries. It considers both precision and recall across different recall levels. mAP, like NDCG, is a rank-aware metric, making it useful for evaluating systems where the order of retrieval matters. In one example, a mAP of 0.2 means that, on average, the language model 120 includes the correct answers within the top 5 retrieved passages. The model manager 118 can additionally or instead calculate a Mean Reciprocal Rank (mRR). mRR is the average of the reciprocal ranks of the first relevant document for each query and is particularly useful when dealing with multiple passages that have the same meaning. mRR focuses on the position of the first relevant document, providing a clear indicator of the retrieval system's ability to rank relevant documents highly.

The model manager 118 can compare such metrics to a threshold (e.g., a defined threshold or defined thresholds for each metric). Responsive to determining at least one metric satisfies a threshold (e.g., is lower or higher than a threshold, as defined in the system), the model manager 118 can determine or select a method to mitigate the errors by correcting parametric knowledge through curated pre-training data, supervised fine-tuning (SFT), and alignment, or by incorporating external knowledge during inference.

The model manager 118 can check for retrieval errors. In some cases, the model manager 118 can do so responsive to determining the metrics generated for the hallucination and knowledge errors check do not satisfy the threshold. Retrieval errors can occur when the model cannot access current information to accurately answer questions with time-sensitive answers. To check for retrieval errors, the model manager 118 can generate the following metrics:

Mean Average Precision (MAP): MAP provides an average precision score across multiple queries, considering the ranking of retrieved documents.

Mean Reciprocal Rank (MRR): MRR measures the average of the reciprocal ranks of the first relevant document for a set of queries and is particularly useful for question-answering tasks.

Hit Rate: This metric assesses the proportion of queries for which at least one relevant document is retrieved and is a simple yet effective way to gauge retrieval effectiveness.

Top-k Accuracy: Evaluates the accuracy of the model in retrieving relevant documents within the top-k results. This can help measure how well the model ranks relevant documents.

Query Success Rate: Measures the percentage of queries that return at least one relevant document from the total number of queries processed.

Error Rate: The error rate can be calculated as the number of retrieval errors (false positives and false negatives) divided by the total number of queries.

The model manager 118 can compare such metrics to a threshold (e.g., a defined threshold or defined thresholds for each metric). Responsive to determining at least one metric satisfies a threshold (e.g., is lower or higher than a threshold, as defined in the system), the model manager 118 can determine or select a method to mitigate the errors by integrating external knowledge and providing it within the context. In some examples, a training or fine tuning method can be selected to mitigate errors.

In some cases, the model manager 118 can perform a retrieval error analysis. The model manager 118 can do so, for example, by examining false positives (e.g., examining irrelevant retrieved documents to spot patterns) or by examining false negatives (e.g., find relevant documents missed to understand model shortcomings).

The model manager 118 can evaluate for inherent falsehood errors in the original natural language query. In some cases, the model manager 118 can do so responsive to determining the metrics generated for the retrieval errors check do not satisfy the threshold. Inherent falsehood errors can occur when the original prompt or previously generated context contains inherent inaccuracies, resulting in an incorrect or unsuitable response. The model manager 118 can do so by analyzing historical prompt query logs to identify patterns in retrieval errors, such as common prompts/queries that yield low precision or high bounce rates. Addressing this issue requires crafting better-engineered prompts or explicitly instructing or training the language model 120 to first identify false premises in the prompt and then rephrase the question accordingly, such as by using a cost function to train the language model 120 to assign higher similarity scores to relevant documents.

The model manager 118 can conduct a review for reasoning mistakes that occur when the claim uses flawed logic, as well as irrelevant errors where the content does not pertain to the prompt. Metrics under this category include calculating coverage and sparsity metrics. Coverage measures the proportion of relevant documents retrieved against the total number of relevant documents available in the dataset. Sparsity evaluates the sparsity of retrieval results by analyzing the distribution of relevant documents from a RAG knowledge base and whether many relevant documents are missed.

The model manager 118 can compare such metrics to a threshold (e.g., a defined threshold or defined thresholds for each metric). Responsive to determining at least one metric satisfies a threshold (e.g., is lower or higher than a threshold, as defined in the system), the model manager 118 can determine or select a method of training the language model 120 to adjust the weights or parameters using supervised learning to better perform RAG queries.

If the model manager 118 does not identify any errors from the above-described metrics, the model manager 118 can use a step called "decontextualization with atomic decomposition." This involves breaking a complex sentence into simpler, standalone statements that do not require additional context. This approach allows for an analytical examination of the individual meanings. In this method of "decontextualization with atomic decomposition," the model manager 118 may identify the main components and analyze the sentence to see if any phrases, clauses, or statements can be separated from the main claim once the context is removed. For instance, "The teacher who was awarded the Nobel Prize for their groundbreaking research published a new paper on climate change" can be broken down with decontextualization as follows: "The teacher published a new paper. The teacher was awarded the Nobel Prize. The research is groundbreaking. The paper is on climate change." However, this method might come with drawbacks such as loss of nuance of the sublet meaning conveyed by the original context and interplay between words, sentence structures and surrounding information. Also, there is a high chance of misinterpretation without a context, the meaning of decontextualized claim may be misinterpreted or taken out of context. Decontextualization can also lead to loss of some intricate details and connection between terms and reduce the coherence and flow of text.

In some cases, the model manager 118 can send the decontextualized output as feedback to the original pipeline at the curated individual facts step for re-evaluation. The decontextualized output can undergo claim-level fact-checking in the original pipeline for re-evaluation.

Figure 2:
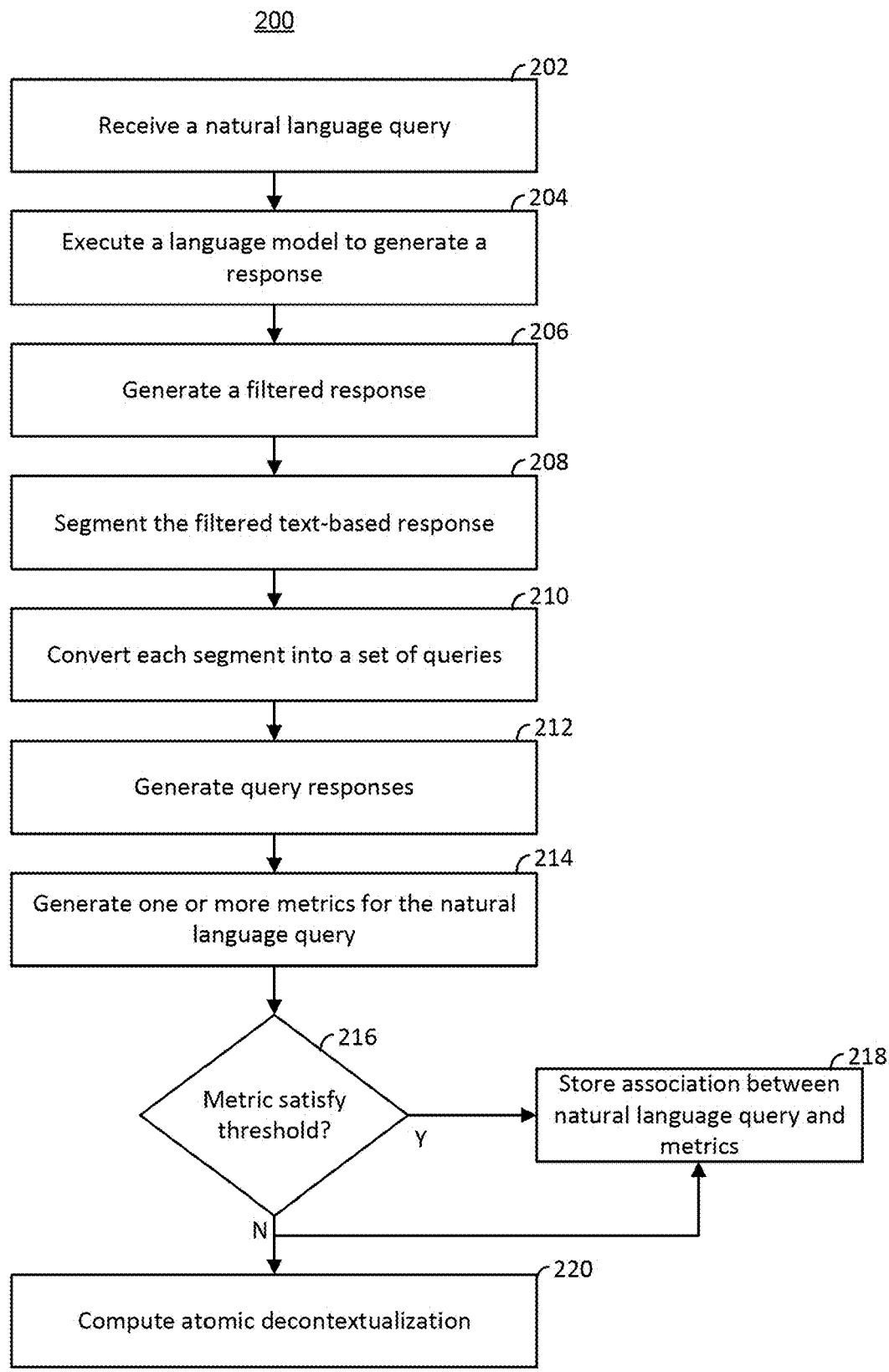
FIG. 2 illustrates an example method for detecting or remediating hallucinations for a language model, in accordance with an implementation.

FIG. 2 illustrates an example method 200 for detecting or remediating hallucinations for a language model, in accordance with an implementation. The method 200 can be performed by a data processing system (e.g., the data processing system 102 and/or the user device 104, each shown and described with reference to FIG. 1, a server system, etc.). The method 200 may include more or fewer operations and the operations may be performed in any order. Performance of the method 200 may enable the data processing system to detect or remediating the hallucinations that a language model generates when generating responses to natural language queries that include multiple facts (e.g., facts requested in the natural language query).

In the method 200, at operation 202, the data processing system receives a natural language query. The data processing system can receive the natural language query from a client device or a user device. For example, a user can access the client device. The client device can present a chat interface on a user interface presented on a display of the client device. The chat interface can include a form into which a user can input text or audio as natural language queries. The text or audio can include a request for one or more facts. For example, the text or audio can include the request "Can you provide me with some interesting facts about the solar system, the history of the internet, and the benefits of a balanced diet?" This request that with multiple facts in a response. The user can input such a natural language query and select a submit button on the user interface to cause the client device to transmit (e.g., over a communications network via an established connection) the natural language query to the data processing system. The data processing system can receive the transmitted natural language query.

At operation 204, the data processing system executes a language model. The language model can be a small language model, a large language model, a transformer, or any other type of language model. The data processing system can execute the language model using the natural language as input. Based on the execution, the language model can generate a response (e.g., a text-based response or otherwise a response that includes text) to the natural language query. The language model can generate the response by retrieving one or more data sets from a data repository. The language model can retrieve the data sets using a RAG technique by generating an embedding from the natural language query and using the embedding to query the data repository. The language model can apply weights and parameters to the retrieved data sets based on the natural language query to generate the response to the natural language query.

At operation 206, the data processing system can generate a filtered response. The filtered response can include one or more statements from the response to the natural language query generated by the language model. One or more, or each, of the one or more statements can include a fact (e.g., a fact requested in the natural language query). The data processing system can generate the filtered text-based response by applying one or more filtering criteria to the response. For example, the data processing system can remove any statements, portions, or strings that have at least one characteristic from a group of characteristics consisting of a first-person pronoun, a presence of one or more question marks, a pronoun of a defined type (e.g., a vague pronoun that does not clearly refer to a specific noun), or an absence of a named entity. The data processing system can use a natural language processing model or a language model configured or trained to apply such rules to text to remove portions of the response. In doing so, the data processing system can generate the filtered response that has been divided by portions removed that satisfy or do not satisfy the filtering criteria.

At operation 208, the data processing system segments the text-based response (e.g., the filtered text-based response in cases in which the response is filtered according to the filtering criteria). The data processing system can segment the text-based response into a plurality of segments that each corresponds to a different fact-based response (e.g., a different fact). In doing so, the data processing system can generate separate segments (e.g., strings) that each contain a different fact. The data processing system can segment the response using a language model (e.g., a second language model). For example, the data processing system can input the response or filtered response into the language model with instructions to divide the response into separate strings that each correspond to a different fact. The data processing system can execute the language model based on the input response to cause the language model to generate (e.g., by playing trained or learned weights to the response) an output that segments the response into separate segments (e.g., separate strings that are separated by an indicator, such as a space, a period, a mark, a dash, a dot, etc.).

At operation 210, the data processing system converts each segment into a set of queries. The set of queries can be configured to be used to search the data repository. For example, the set of queries can be or include an embedding (e.g., a numerical vector) generated from the segment. The data processing system can generate such an embedding by applying a language model or otherwise an encoder to the segment. The embedding can be configured to be used to search the data repository because the data repository may be a vector database that contains one or more data sets (e.g., paragraphs, pages, tables, images, videos, or any other type of data) with embeddings that were generated in the same vector space as the embedding (e.g., embeddings generated by the same model used to generate the embedding from the segment). The data processing system can similarly generate an embedding or query for each segment generated from the response to the natural language query.

In some cases, the data processing system can generate multiple queries for each segment. For example, the data processing system can use a language model or another natural language processing model to generate each segment in different formats or syntaxes. The data processing system can then generate an embedding for each of the variations of the segment to generate a set of queries for the segment.

At operation 212, the data processing system generates query responses. The data processing system can generate the query responses to each query generated for each segment generated for the natural language query. To do so, the data processing system can use each query to query the data repository. For example, for each embedding, the data processing system can compare the embeddings to embeddings stored in the data repository. The data processing system can identify one or more embeddings with a similarity (e.g., a matching similarity or a cosine similarity) above a threshold (e.g., a defined threshold) and/or as a defined number (e.g., one or more) of embeddings with the highest similarity to the embedding. The data processing system can identify the dataset or datasets that correspond with the identified embedding or embeddings and retrieve the datasets as query responses.

At operation 214, the data processing system generates one or more metrics for the response to the natural language query. In doing so, the data processing system can generate one or more metrics for each segment and/or one or more metrics for the response as a whole. For example, the data processing system can generate segment-level metrics such as a statement-level factuality metric, a support metric, a relevancy metric, a fluency metric, a diversity metric, a repetition metric, a BLEU metric, a factual similarity metric, an F1 score, and/or one or more hallucination metrics (e.g., an NE-based metric or an entailment ratio metric). The data processing system can generate such metrics for each segment. The data processing system can additionally generate response level metrics. For example, the data processing system can generate a response level factuality metric, which may be an aggregate of the statement level factuality metrics from each segment or a separately determined response level factuality metric, and/or a response level fluency metric. In some cases, the data processing system can generate an aggregate factuality score for the natural language query (e.g., the response to the natural language query) based on the factuality score the data processing system generated for each query or each segment (e.g., based on the set of queries generated for each segment). The data processing system can generate such metrics using the systems and methods described herein.

At operation 216, the data processing system determines whether any of the generated metrics does not satisfy a threshold. For example, the data processing system can compare the generated metrics (e.g., the individual metrics for each segment and/or the individual metrics for the response) to a threshold. The threshold can be the same or different for the different metrics (e.g., for the different types of metrics). The data processing system can determine whether the metrics satisfy the metrics based on the comparison based on whether the metrics exceed or are less than the threshold. In some cases, determining whether a metric satisfies a threshold can depend on the type of the metric. For example, an NE error metric can satisfy a threshold if the NE error metric exceeds the threshold, and an entailment ratio metric can satisfy a threshold if the entailment ratio metric is less than a threshold. The data processing system can compare each metric generated for the natural language query to the threshold and determine whether the metric satisfies the natural language query based on the comparison.

Responsive to determining each of the metrics generated for the response to the natural language query satisfies the threshold, at operation 218, the data processing system stores an association between the natural language query the response and/or the metrics in memory. The data processing system can do so by storing such data in a record (e.g., a data structure or table). Accordingly, the data may subsequently be available for querying or searching.

However, responsive to determining at least one, a defined number, or a particular type of metric does not satisfy the threshold, at operation 220, the data processing system computes knowledge errors, falsehood errors, retrieval errors and further proceeds through decontextualization process to assess if decontextualization helps to reduce hallucinations. This process gets repeated for any number of natural language queries.

In some examples, the data processing system can train the language model using a supervised learning, an unsupervised learning, and/or a semi-supervised learning technique. For example, the data processing system can train the language model using a labeled training dataset and using backpropagation techniques to adjust the weights and/or parameters of the language model. In another example, the data processing system can train the language model by feeding text samples into the language model and adjusting the language model based on the text samples.

Figure 3A:
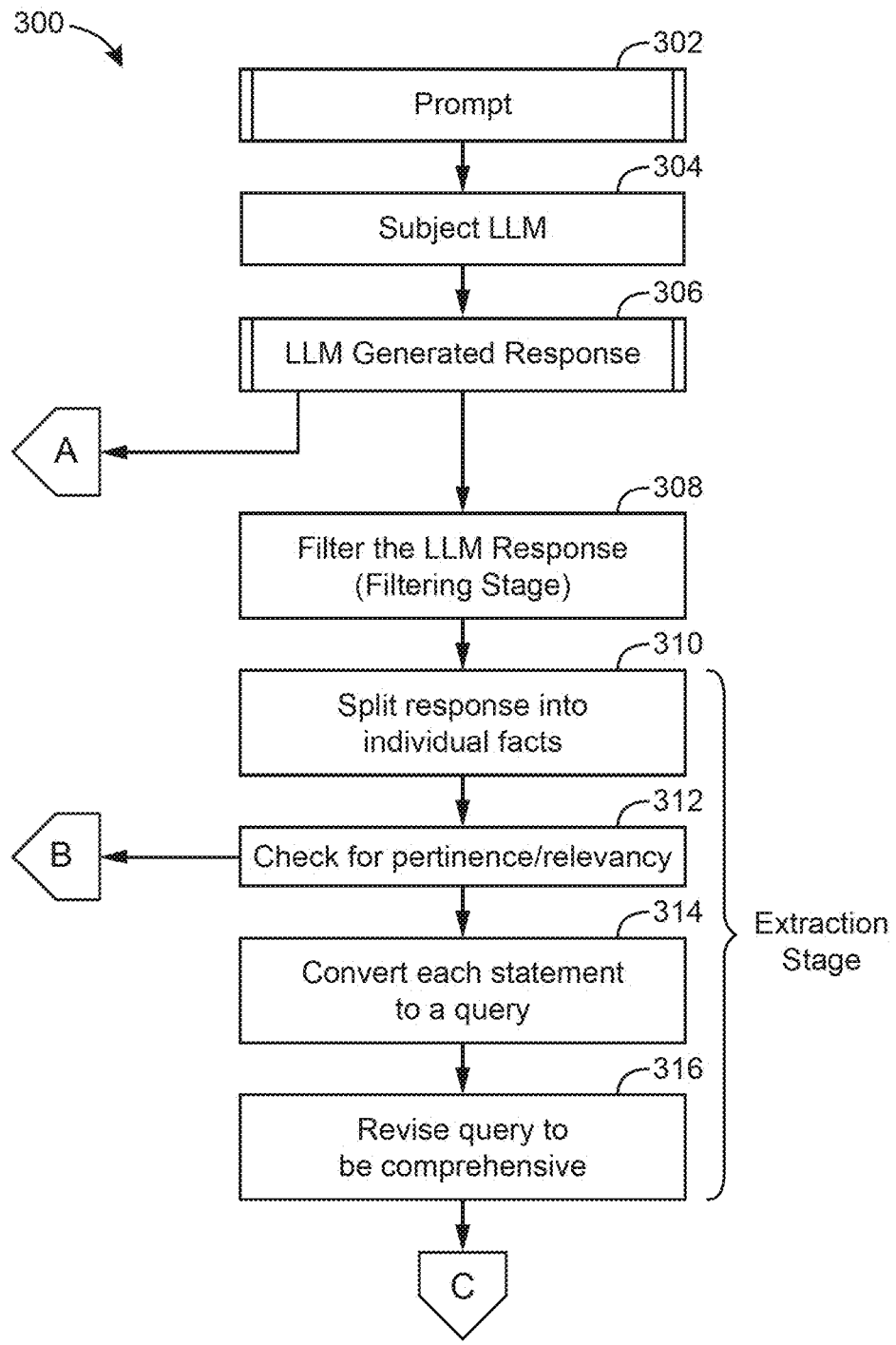
FIGS. 3A-3C illustrates a sequence diagram for detecting or remediating hallucinations for a language model, in accordance with an implementation.
Figure 3B:
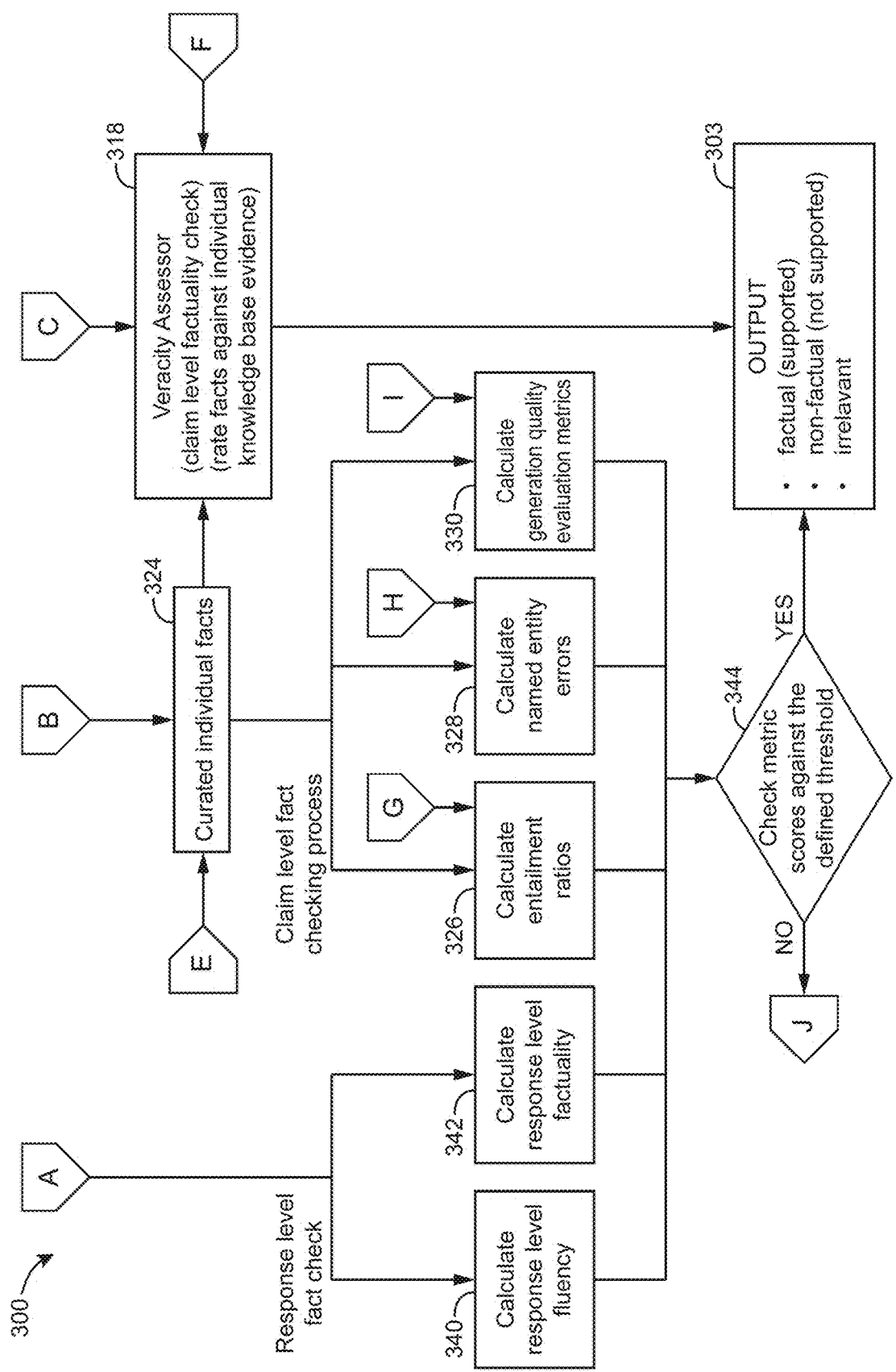
Figure 3C:
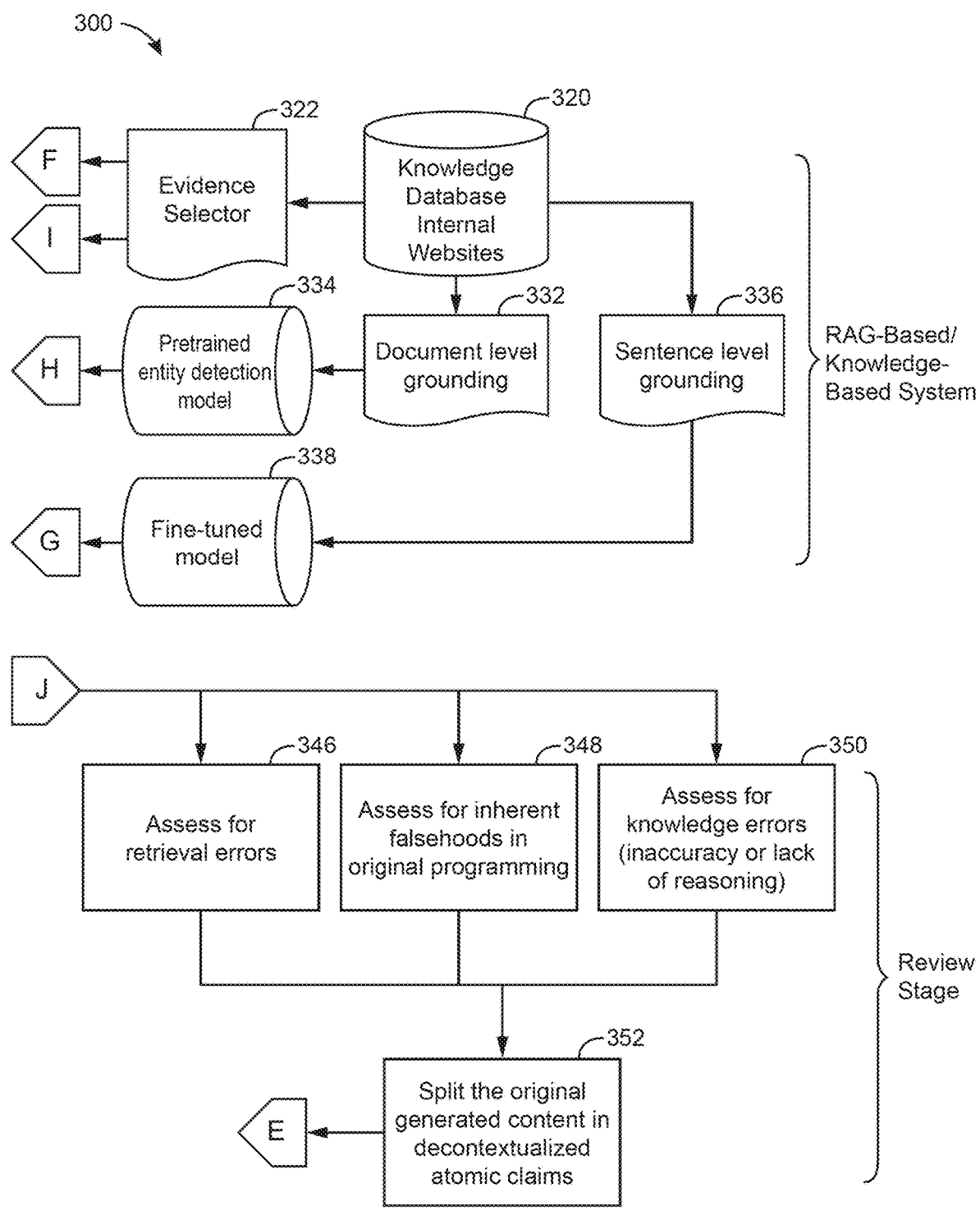

FIGS. 3A-C illustrate a sequence diagram of a sequence 300 for detecting or remediating hallucinations for a language model, in accordance with an implementation. The sequence 300 can be performed by a data processing system (e.g., a client device or the data processing system 102, shown and described with reference to FIG. 1, a server system, etc.). The sequence 300 may include more or fewer operations and the operations may be performed in any order.

In the sequence 300, the data processing system can receive a prompt. The prompt can be a natural language query requesting multiple facts. The data processing system can receive the prompt from a client device. The data processing system can execute a language model 304 using the prompt as input. In doing so, the language model 304 can query a data repository using a RAG-based technique to retrieve one or more data sets. The language model 304 can process the data sets based on the natural language query to generate a response 306 to the natural language query.

At an operation 308, the data processing system can filter the response to generate a filtered response. The data processing system can filter the response using one or more filtering criteria. In doing so, the data processing system can remove portions of the response that do not contain any facts. Such can be beneficial because the sequence 300 may be used to train a language model to reduce hallucinations in fact-based responses.

In an extraction stage, at operation 310, the data processing system can split or segment the response into individual segments or facts. At operation 312, the data processing system can check for pertinence or relevance to the natural language query. At operation 314, the data processing system can convert each split statement into a separate query or set of queries. In some cases, at operation 316, the data processing system can revise or update (e.g., using a language model) the queries to be comprehensive (e.g., to be complete sentences).

At operation 318, the data processing system can determine a factuality of each segment. The data processing system can determine the factuality of a segment using a ground truth data repository 320. For example, the ground truth data repository 320 can store data that the data processing system uses as ground truth data. The data processing system can retrieve, using an evidence selector 322 (e.g., a natural language processor), data sets from the ground truth data repository 320 that include the facts that correspond (e.g., correspond to the same subject matter as) to the segments of the response. In some cases, the data processing system can retrieve data sets from the data repository using the query or queries generated for each segment and then retrieve, using the evidence selector 322, data sets or facts from the ground truth data repository 320 that correspond to the same data sets. The data processing system can determine the factuality of each segment by determining whether the data sets retrieved in the queries and/or facts of the response match the data sets retrieved from the ground truth data repository 320. In some cases, the data processing system can use input or curated facts 324 for the comparison to determine the factuality of each segment.

The data processing system can determine additional metrics for each segment. For example, the data processing system can determine an entailment ratio 326, a named entity error metric 328, and/or a generation quality evaluation metric 330 for each segment. The data processing system can determine the named entity error metric 328 using document level grounding or annotations 332 with a pre-trained entity detection model 334. The data processing system can determine the entailment ratio metric using sentence level grounding or annotations 336 with a finetuned model 338.

The data processing system can additionally or instead determine response level metrics. For example, the data processing system can evaluate the response or filtered response to the natural language query to determine a response level fluency 340 and/or a response level factuality 342 of the response or filtered response to the natural language query.

At operation 344, the data processing system compares one or more of the metrics against a threshold and/or a threshold specific to the type of the metric. Responsive to determining at least one metric does not satisfy the threshold, the data processing system can train the language model 304. In doing so, the data processing system can determine a manner of training language model 304. For example, the data processing system can assess for retrieval error 346, assess for inherent falsehoods in the original prompt 348, and/or assess for knowledge errors 350 (e.g., inaccuracy or lack of reasoning). The data processing system may determine whether to fine tune the language model 304 to process datasets more accurately in response to a knowledge error, update the data repository or finetune the language model 304 in response to a retrieval error, and/or update the model it more accurately identify improper prompts in response to an inherent falsehood in the original prompt.

Responsive to determining, at operation 344, none of errors 346, 348, and/or 350, at operation 352, the data processing system can split the original generated content into decontextualized atomic claims as the curated individual facts and repeat the operations 312, 326-330, and 344-352.

Responsive to determining, at operation 344, each of metrics generated for the response to the prompt 302 satisfy the threshold, the data processing system can generate an output 352. The output can indicate whether the response was factually supported, not supported, and/or irrelevant. The data processing system can store the output in memory and/or present the output on a user interface.

In an aspect, the present disclosure describes a system for detecting or remediating hallucinations in a first language model. The system can include one or more processors and one or more machine-readable media storing program instructions that, when executed by the one or more processors, causes the one or more processors to perform operations comprising receiving, from a chat interface, a natural language query, the natural language query comprising a request for a plurality of facts; executing the first language model using the natural language query to generate a text-based response to the natural language query; generating a filtered text-based response including one or more statements from the text-based response that satisfy one or more filtering criteria; segmenting, using a second language model, the filtered text-based response into a plurality of segments each corresponding to a different fact-based response to the natural language query; for each of the plurality of segments: converting the segment into a set of queries each configured to be used to search a data repository; for each query of the set of queries: generating a query response to the query by using the query to search the data repository; and generating a factuality score of the segment for the text-based response to the natural language query based on the set of queries generated for the segment; generating an aggregate factuality score for the natural language query based on the factuality score for each of the plurality of segments; and computing knowledge errors, retrieval errors to determine underlying factuality errors. In some examples, the system generates an aggregate factuality score for the natural language query based on the factuality score for each of the plurality of segments; and trains the first language model responsive to determining the factuality score does not satisfy a threshold.

In another aspect, the present disclosure describes a method. The method can include receiving, by one or more processors, a natural language query; executing, by the one or more processors, the language model using the natural language query to generate a text-based response to the natural language query; segmenting, by the one or more processors, the text-based response into a plurality of segments that each corresponds to a different fact-based response to the natural language query; generating, by the one or more processors, one or more queries for each of the plurality of segments, each of the one or more queries configured to be used to search a data repository; for each query of the one or more queries generated for each of the plurality of segments, generating, by the one or more processors, a query response to the query by using the query to search the data repository; generating, by the one or more processors, one or more metrics based on the query response generated for each query of the one or more queries generated for each of the plurality of segments; and leveraging pretrained models by the one or more processors to compute one or more metrics, performing decontextualization when metrics not satisfying a threshold. In some examples, there is a training step based on the failure to satisfy a threshold.

In another aspect, the present disclosure describes non-transitory computer-readable media, comprising instructions that, when executed by one or more processors, cause the one or more processors to receiving a natural language query; executing a language model using the natural language query to generate a text-based response to the natural language query; segmenting the text-based response into a plurality of segments that each corresponds to a different fact-based response to the natural language query; generating one or more queries for each of the plurality of segments, each of the one or more queries configured to be used to search a data repository; for each query of the one or more queries generated for each of the plurality of segments, generating a query response to the query by using the query to search the data repository; generating one or more metrics based on the query response generated for each query of the one or more queries generated for each of the plurality of segments; and performing atomic decontextualization based on the one or more metrics not satisfying a threshold.

Computing Environment

Figure 4:
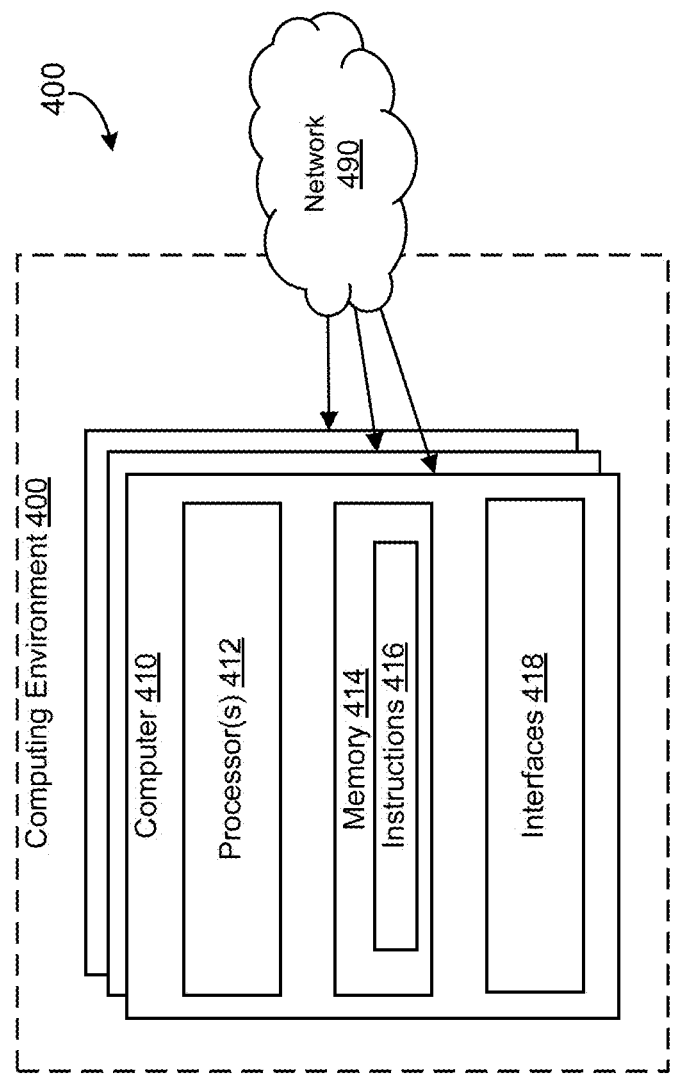
FIG. 4 discloses a computing environment in which aspects of the present disclosure may be implemented, in accordance with an implementation.

FIG. 4 discloses a computing environment 400 in which aspects of the present disclosure may be implemented. A computing environment 400 is a set of one or more virtual or physical computers 410 that individually or in cooperation achieve tasks, such as implementing one or more aspects described herein. The computers 410 have components that cooperate to cause output based on input. Example computers 410 include desktops, servers, mobile devices (e.g., smart phones and laptops), payment terminals, wearables, virtual/augmented/expanded reality devices, spatial computing devices, virtualized devices, other computers, or combinations thereof. In particular example implementations, the computing environment 400 includes at least one physical computer.

The computing environment 400 may specifically be used to implement one or more aspects described herein. In some examples, one or more of the computers 410 may be implemented as a user device, such as a mobile device, and others of the computers 410 may be used to implement aspects of a machine learning framework useable to train and deploy models exposed to the mobile device or provide other functionality, such as through exposed application programming interfaces.

The computing environment 400 can be arranged in any of a variety of ways. The computers 410 can be local to or remote from other computers 410 of the environment 400. The computing environment 400 can include computers 410 arranged according to client-server models, peer-to-peer models, edge computing models, other models, or combinations thereof.

In many examples, the computers 410 are communicatively coupled with devices internal or external to the computing environment 400 via a network 490. The network 490 is a set of devices that facilitate communication from a sender to a destination, such as by implementing communication protocols. Example networks 490 include local area networks, wide area networks, intranets, or the Internet.

In some implementations, computers 410 can be general-purpose computing devices (e.g., consumer computing devices). In some instances, via hardware or software configuration, computers 410 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 410 include one or more processors 412, memory 414, and one or more interfaces 418. Such components can be virtual, physical, or combinations thereof.

The one or more processors 412 are components that execute instructions, such as instructions that obtain data, process the data, and provide output based on the processing. The one or more processors 412 often obtain instructions and data stored in the memory 414. The one or more processors 412 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 412 include at least one physical processor implemented as an electrical circuit. Example providers processors 412 include INTEL, AMD, QUALCOMM, TEXAS INSTRUMENTS, and APPLE.

The memory 414 is a collection of components configured to store instructions 416 and data for later retrieval and use. The instructions 416 can, when executed by the one or more processors 412, cause execution of one or more operations that implement aspects described herein. In many examples, the memory 414 is a non-transitory computer-readable medium, such as random access memory, read only memory, cache memory, registers, portable memory (e.g., enclosed drives or optical disks), mass storage devices, hard drives, solid state drives, other kinds of memory, or combinations thereof. In certain circumstances, transitory memory 414 can store information encoded in transient signals.

The one or more interfaces 418 are components that facilitate receiving input from and providing output to something external to the computer 410, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors, such as those using the Global Positioning System), other input components, or combinations thereof (e.g., a touch sensitive display). The one or more interfaces 418 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as WI-FI, cellular, BLUETOOTH, ZIGBEE, or other protocols). One or more of the one or more interfaces 418 can facilitate connection of the computing environment 400 to a network 490.

The computers 410 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 5:
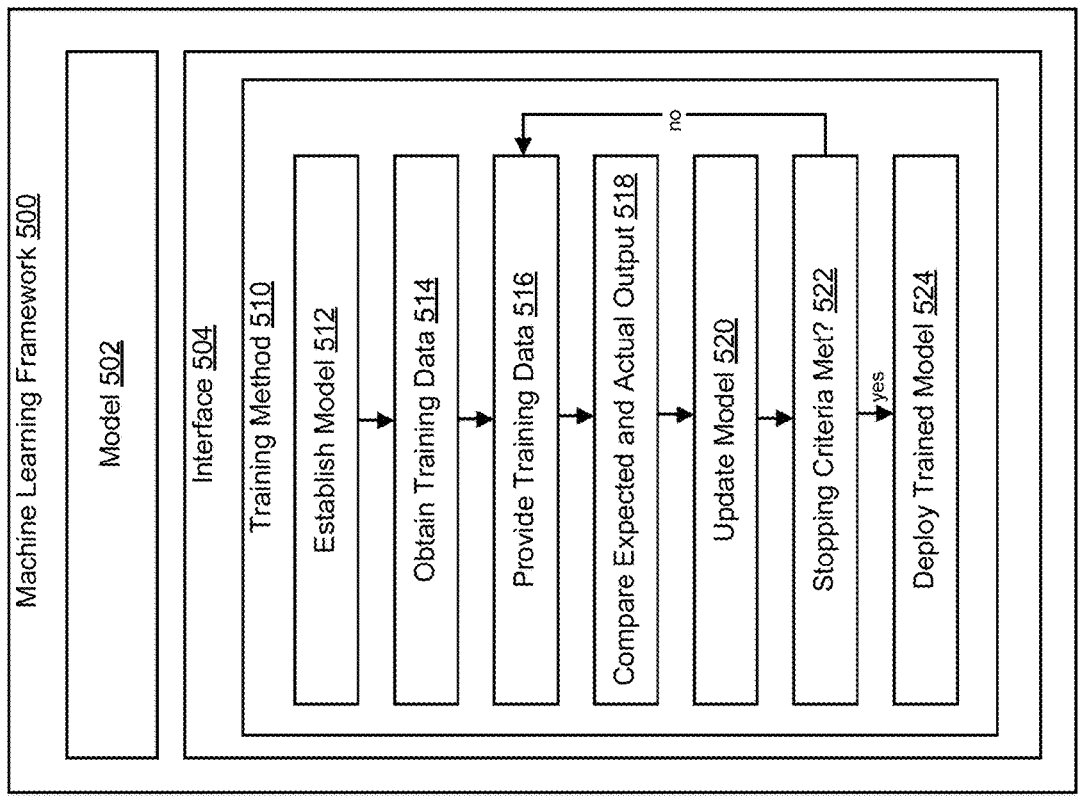

FIG. 5 illustrates an example machine learning framework 500 that techniques described herein may benefit from. A machine learning framework 500 is a collection of software and data that implements artificial intelligence trained to provide output, such as predictive data, based on input. Examples of artificial intelligence that can be implemented with machine learning ways include neural networks (including recurrent neural networks), language models (including so-called "large language models"), generative models, natural language processing models, adversarial networks, decision trees, Markov models, support vector machines, genetic algorithms, others, or combinations thereof. A person of skill in the art, having the benefit of this disclosure, will understand that these artificial intelligence implementations need not be equivalent to each other and may instead select from among them based on the context in which they will be used. Machine learning frameworks 500 or components thereof are often built or refined from existing frameworks, such as TENSORFLOW by GOOGLE, INC. or PYTORCH by the PYTORCH community.

The machine learning framework 500 can include one or more models 502 that are the structured representation of learning and an interface 504 that supports use of the model 502.

The model 502 can take any of a variety of forms. In many examples, the model 502 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 502 can include a representation of memory (e.g., providing long short-term memory functionality). Where the set includes more than one model 502, the models 502 can be linked, cooperate, or compete to provide output.

The interface 504 can include software procedures (e.g., defined in a library) that facilitate the use of the model 502, such as by providing a way to establish and interact with the model 502. For instance, the software procedures can include software for receiving input, preparing input for use (e.g., by performing vector embedding, such as using Word2Vec, BERT, or another technique), processing the input with the model 502, providing output, training the model 502, performing inference with the model 502, fine tuning the model 502, other procedures, or combinations thereof.

In an example implementation, interface 504 can be used to facilitate a training method 510 that can include operation 512. Operation 512 includes establishing a model 502, such as initializing a model 502. The establishing can include setting up the model 502 for further use (e.g., by training or fine tuning). The model 502 can be initialized with values. In examples, the model 502 can be pre-trained. Operation 514 can follow operation 512. Operation 514 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 502. Operation 516 can follow operation 514. Operation 516 includes providing a portion of the training data to the model 502. This can include providing the training data in a format usable by the model 502. The framework 500 (e.g., via the interface 504) can cause the model 502 to produce an output based on the input. Operation 518 can follow operation 516. Operation 518 includes comparing the expected output with the actual output. In an example, this can include applying a loss function to determine the difference between expected and actual. This value can be used to determine how training is progressing. Operation 520 can follow operation 518. Operation 520 includes updating the model 502 based on the result of the comparison. This can take any of a variety of forms depending on the nature of the model 502. Where the model 502 includes weights, the weights can be modified to increase the likelihood that the model 502 will produce correct output given an input. Depending on the model 502, backpropagation or other techniques can be used to update the model 502. Operation 522 can follow operation 520. Operation 522 includes determining whether a stopping criterion has been reached, such as based on the output of the loss function (e.g., actual value or change in value over time). In addition to, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 514. If the stopping criterion has been satisfied, the flow can move to operation 522. Operation 522 includes deploying the trained model 502 for use in production, such as providing the trained model 502 with real-world input data and produce output data used in a real-world process. The model 502 can be stored in memory 414 of at least one computer 410, or distributed across memories of two or more such computers 410 for production of output data (e.g., predictive data).

Application of Techniques

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for, and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for remediating hallucinations in a first language model, the system comprising one or more processors and one or more machine-readable media storing program instructions that, when executed by the one or more processors, causes the one or more processors to perform operations comprising:
   receiving, from a chat interface, a natural language query, the natural language query comprising a request for a plurality of facts;

executing the first language model using the natural language query to generate a text-based response to the natural language query;
generating a filtered text-based response including one or more statements from the text-based response that satisfy one or more filtering criteria;
segmenting, using a second language model, the filtered text-based response into a plurality of segments each corresponding to a different fact-based response to the natural language query;
for each of the plurality of segments:
converting the segment into a set of queries each configured to be used to search a data repository;
for each query of the set of queries:
generating a query response to the query by using the query to search the data repository; and
generating a factuality score of the segment for the text-based response to the natural language query based on the set of queries generated for the segment;
generating an aggregate factuality score for the natural language query based on the factuality score for each of the plurality of segments; and
computing atomic decontextualization of the response, responsive to determining the factuality score is below a threshold for metrics in which a high value corresponds with a high factuality or is above the threshold for metrics in which a low value corresponds to an increase in the factuality score.

2. The system of claim 1, wherein filtering the text-based response comprises removing one or more statements from the text-based response that includes at least one characteristic from a group of characteristics consisting of:
a first-person pronoun;
a presence of one or more question marks;
a pronoun of a defined type; and
an absence of a named entity.

3. The system of claim 1, wherein the operations further comprise:
generating a plurality of metrics for the natural language query, the plurality of metrics comprising the aggregate factuality score; and
comparing, by the one or more processors, each of the plurality of metrics to a respective threshold.

4. A method for remediating hallucinations in a language model, comprising:
receiving, by one or more processors, a natural language query;
executing, by the one or more processors, the language model using the natural language query to generate a text-based response to the natural language query;
segmenting, by the one or more processors, the text-based response into a plurality of segments that each corresponds to a different fact-based response to the natural language query;
generating, by the one or more processors, one or more queries for each of the plurality of segments, each of the one or more queries configured to be used to search a data repository;
for each query of the one or more queries generated for each of the plurality of segments, generating, by the one or more processors, a query response to the query by using the query to search the data repository;
generating, by the one or more processors, one or more metrics based on the query response generated for each query of the one or more queries generated for each of the plurality of segments; and
performing decontextualization of the response, at an atomic level, by the one or more processors, based on at least one of the one or more metrics not satisfying a threshold.

5. The method of claim 4, further comprising:
filtering, by the one or more processors, the text-based response to the natural language query by removing language from the text-based response that satisfy one or more filtering criteria,
wherein segmenting the text-based response comprises segmenting, by the one or more processors, the filtered text-based response.

6. The method of claim 5, wherein filtering the text-based response comprises removing, by the one or more processors, one or more statements from the text-based response that includes at least one characteristic from a group of characteristics consisting of:
a first-person pronoun;
a presence of one or more question marks;
a pronoun of a defined type; and
an absence of a named entity.

7. The method of claim 4, wherein segmenting the text-based response into a plurality of segments comprises:
identifying, by the one or more processors using a second language model, individual facts included in the text-based response, wherein each individual fact is a segment of the plurality of segments.

8. The method of claim 4, wherein generating the one or more queries for each of the plurality of segments comprises, for each segment:
generating, by the one or more processors using a second language model, the one or more queries for the segment using a second language model.

9. The method of claim 4, wherein generating the one or more metrics comprises:
generating, by the one or more processors for each segment of the plurality of segments, a factuality score indicating a factuality of the segment to responding to the text-based response to the natural language query, the method further comprising:
generating, by the one or more processors, an aggregate factuality score for the natural language query based on the factuality score for each segment of the plurality of segments,
wherein performing decontextualization, by the one or more processors, the language model responsive to the aggregate factuality score not satisfying a threshold.

10. The method of claim 4, wherein generating the one or more metrics comprises, for each query response:
generating, by the one or more processors, a hallucinated named entity error metric,
wherein training the language model comprises training, by the one or more processors, the language model responsive to the hallucinated named entity error not satisfying a threshold.

11. The method of claim 4, further comprising:
generating, by the one or more processors in response to determining the at least one metric does not satisfy the threshold, a second plurality of metrics for the response to the natural language query;
determining, by the one or more processors, at least one second metric of the second plurality of metrics that does not satisfy a second threshold;
wherein training the language model comprises training, by the one or more processors, the language model using a training technique selected from a plurality of training techniques based on a type of the at least one second metric.

12. The method of claim 4, further comprising:
storing, by the one or more processors, one or more ground truth sentences; and
generating, by the one or more processors for each query response, one or more query metrics for the query response based on a comparison between the query response and a stored ground truth sentence.

13. The method of claim 4, wherein generating the one or more metrics comprises:
generating, by the one or more processors, a fluency, a diversity, and a repetition for a segment of the plurality of segments,
wherein training the language model based on the one or more metrics comprises:
determining at least one of the generated fluency diversity, or repetition satisfy the threshold; and
training the language model responsive to the determining the at least one of the generated fluency diversity, or repetition satisfy the threshold.

14. One or more non-transitory, machine-readable media storing program instructions that, when executed by one or more processors, causes the one or more processors to perform operations comprising:
receiving a natural language query;
executing a language model using the natural language query to generate a text-based response to the natural language query;
segmenting the text-based response into a plurality of segments that each corresponds to a different fact-based response to the natural language query;
generating one or more queries for each of the plurality of segments, each of the one or more queries configured to be used to search a data repository;
for each query of the one or more queries generated for each of the plurality of segments, generating a query response to the query by using the query to search the data repository;
generating one or more metrics based on the query response generated for each query of the one or more queries generated for each of the plurality of segments; and
executing atomic level decontextualization of the response, based on the one or more metrics being below a threshold for metrics in which a high value corresponds with a high factuality or being above the threshold for metrics in which a low value corresponds to an increase in the factuality score.

15. The one or more non-transitory, machine-readable media of claim 14, the operations further comprising:
filtering the text-based response to the natural language query by removing language from the text-based response that satisfy one or more filtering criteria,
wherein segmenting the text-based response comprises segmenting the filtered text-based response.

16. The one or more non-transitory, machine-readable media of claim 15, wherein filtering the text-based response comprises removing one or more statements from the text-based response that includes at least one characteristic from a group of characteristics consisting of:
a first-person pronoun;
a presence of one or more question marks;
a pronoun of a defined type; and
an absence of a named entity.

17. The one or more non-transitory, machine-readable media of claim 14, wherein segmenting the text-based response into a plurality of segments comprises:
identifying, by the one or more processors using a second language model, individual facts included in the text-based response, wherein each individual fact is a segment of the plurality of segments.

18. The one or more non-transitory, machine-readable media of claim 14, wherein generating the one or more queries for each of the plurality of segments comprises, for each segment:
generating, by the one or more processors using a second language model, the one or more queries for the segment using a second language model.

19. The one or more non-transitory, machine-readable media of claim 14, wherein generating the one or more metrics comprises:
generating for each query response, a factuality score indicating a factuality of the query response to responding to the text-based response to the natural language query, the operations further comprising:
generating, by the one or more processors, an aggregate factuality score for the natural language query based on the factuality score for each query response generated for each of the plurality of segments,
wherein executing decontextualization comprises of atomic level decontextualization responsive to the aggregate factuality score not satisfying a threshold.

20. The one or more non-transitory, machine-readable media of claim 14, wherein generating the one or more metrics comprises, for each query response:
generating a hallucinated named entity error metric,
wherein training the language model comprises training, by the one or more processors, the language model responsive to the hallucinated named entity error not satisfying a threshold.

* * * * *